3,039,255
APPARATUS FOR SEPARATING LIQUID OR
SOLID PARTICLES FROM A GAS
Pieter Marinus van der Meer, Gemaalweg 6,
Lemmer, Netherlands
Filed Sept. 5, 1958, Ser. No. 759,242
Claims priority, application Netherlands July 31, 1958
5 Claims. (Cl. 55—410)

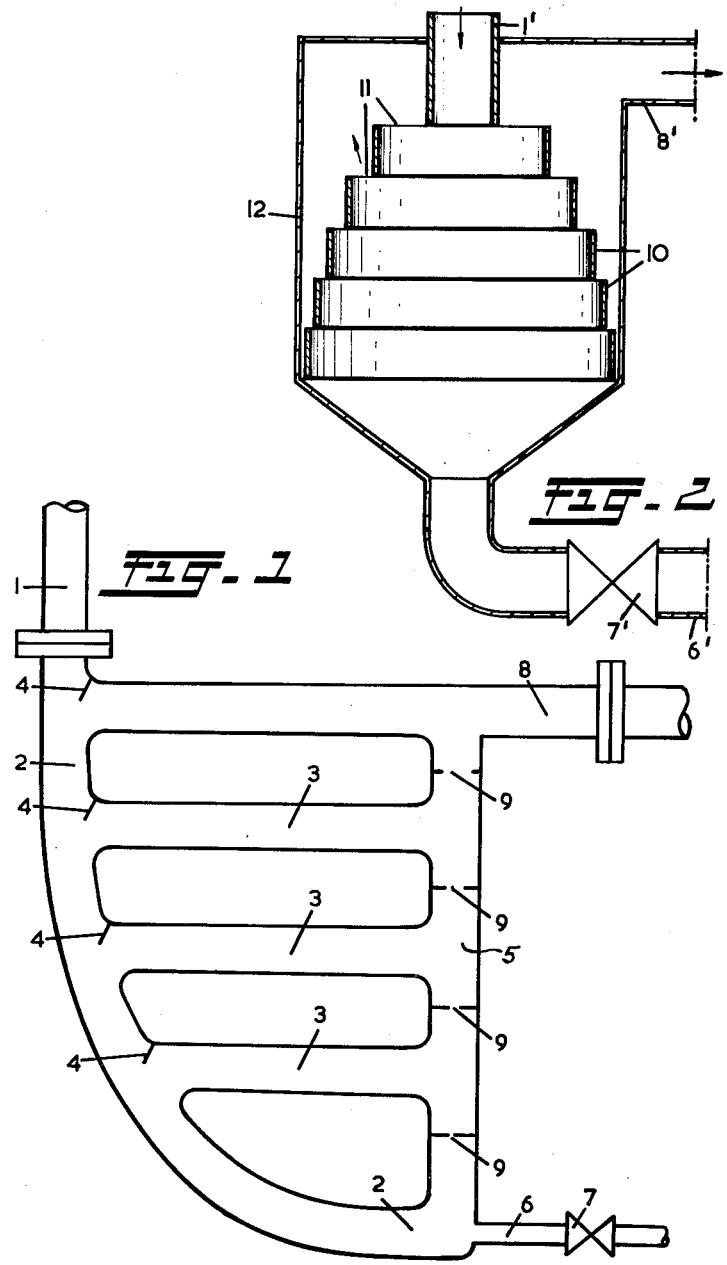

This invention relates to apparatus for cleaning liquid or solid particles from gases. Known devices of this type usually effect the separation of droplets and solid particles from gas streams by centrifugation such as takes place in cyclones or vortex chambers. Such devices, however, have an inadequate effect because in the effluent stream of gas remain liquid droplets and/or solid particles. In order to obviate this drawback, multiple cyclones or vortex chambers are applied in series. This, however, renders the apparatus complicated and expensive.

The present invention provides a simple apparatus which in a surprisingly efficient manner renders an efficient separation of liquid droplets and/or solid particles suspended in the gas stream possible, which separation even exceeds the results obtainable by means of cyclones.

The operation of the apparatus according to the invention is based on the branching-off of gas streams from a rapidly flowing gas stream containing liquid droplets and/or solid particles. This branching-off is so effected that the liquid droplets and/or solid particles remain in the main stream because their kinetic energy is larger than that of the gas surrounding them, so that they will move past the branches. The branched-off gas streams, therefore, are stripped of liquid droplets and/or solid particles, while the main gas stream undergoes a reduction in speed at each branch. The branching-off is continued until the remaining main gas stream has a speed that is too small to enable it to entrain the liquid droplets and/or the solid particles any longer. The operation of the apparatus is independent of the gas pressure and of the gas velocity. Tests carried out with wet steam have shown that as a rule the speed of the main stream that is insufficient to entrain droplets and particles is lower than 50 cm. per second.

The apparatus according to the invention is characterized in that a tubular body adapted for the passage therethrough of gas containing impurities, is provided with a plurality of discharge openings distributed over the length of said body, the discharging directions of which each differ from the local direction of the passage in the body and in that the end of said body is provided with a closable connection to an outlet for the liquid or solid particles. The apparatus according to the invention is preferably so constructed that the discharge openings lead to entrances distributed over the length of a common gas discharge conduit, while the effective passage area of said gas discharge conduit increases towards the point where the gas leaves said gas discharge conduit. The apparatus according to the invention is preferably so constructed that the total passage area of the discharge opening at least equals the passage area of the inlet end of the body. According to another feature of the invention the construction of the apparatus is such that to each discharge opening a branched-off conduit is connected, which branched-off conduits lead to and are in open communication with the gas discharge conduit. According to another preferred embodiment of the apparatus according to the invention the tubular body comprises a plurality of coaxial cylindrical sections, which sections—as seen in the direction of flow—have a stepwise increasing diameter, the common gas discharge conduit being formed by a casing entirely surrounding the tubular body. According to the invention the annular discharge openings may successively have a smaller passage area in the direction in which the section diameters increase.

The invention will be elucidated with reference to the accompanying drawings showing some embodiments of the apparatus. In said drawings:

FIG. 1 is a longitudinal section of a first embodiment, the discharge openings being connected with the gas discharge conduit by means of branched-off conduits; and FIG. 2 is a longitudinal section of another embodiment, the gas discharge conduit being formed by a cylindrical casing surrounding the tubular body forming the gas supply conduit.

In FIGURE 1, the reference numeral 1 designates a supply conduit for wet steam originating, for example, in a boiler. The reference numeral 2 designates the main steam conduit through which the wet steam flows and from which lateral flows are branched off by a plurality of branches 3. The steam flowing through said branches is stripped of liquid droplets. The numeral 4 designates lips which serve to keep liquid droplets in the main conduit from entering the branched-off conduits 3. It is to noted, however, that without said lips or bevelled or bent portions the apparatus still can produce dry steam with a surprising efficiency. The branched-off conduits 3 and the main conduit 2 end in a collecting conduit 5. In the bottom portion of the collecting conduit 5 adjacent the point where the main conduit 2 ends therein a water drain 6 provided with a stop valve 7 is arranged. The dry steam escapes via the collecting conduit 5 to the discharge conduit 8. If desired, one or more passage area restricting elements 9 may be provided in the collecting conduit 5 between the places where the branches end therein, but said elements may also be provided in the branched-off conduits 3 or in the main conduit 2.

The surprising effect of the apparatus described can be shown if a soda solution is dispersed in the wet steam. After draining the liquid from the drain 6 the soda may be shown by means of phenolphthalein because the drained liquid will color the phenophthalein red owing to its alkaline reaction. In other words, the liquid droplets have been conveyed to the drain 6 together with the main stream, while samples of water taken from the conduit 8 owing to their lack of liquid droplets are not capable of coloring the phenolphthalein red. The steam discharged at 8 therefore is perfectly dry and stripped of the liquid droplets originally contained in the steam.

In various cases, one branched-off conduit will suffice; however, it has appeared that optimum results are obtained if a plurality of said branched-off conduits are used. Especially in the case of conduits of large diameter, such as used in intercepting flue dust and in treating wood sawing mills, it is important to impart a low velocity to the branched-off streams.

The number of branched-off streams may vary. Preferably the branching-off always takes place in such a manner that the main gas stream is halved for example or, for example, when intercepting fly dust, is quartered. If the main gas stream is halved and if said main gas stream has an initial velocity of 16 meters per second, the gas stream after the first branching-off is divided into two streams each having a velocity of 8 meters per second; after a second branching-off the velocity is 4 meters per second; after a third branching-off the velocity is two meters per second, etc., if the cross-sectional areas of the branched-off conduits are equal to the cross-sectional area of the main conduit.

However this need not always be the case. By employing branched-off conduits having a diameter different from the diameter of the main conduit (e.g., having a larger diameter), the velocity of the gas stream in the branched-off conduits will be decelerated to a greater extent with respect to the main stream, which favorably influences the effect. Also if branched-off conduits of smaller diameter than that of the main conduits are used it is possible to obtain a reasonably good separation of the impurities. Furthermore the diameters of the branched-off conduits may also mutually differ. The diameter of the main conduit may remain equal or may undergo changes over the length of the conduit. The branched-off conduits end in a collecting conduit in which also the main conduit ends. The branched-off conduits need not be arranged horizontally, but may be at an angle relative to the horizontal plane (e.g. in such a manner that the lowermost end of the branched-off conduits ends in the main conduit and the uppermost end of the branched-off conduits ends in the collecting conduit). If, therefore, in this arrangement owing to some disturbance in the operation liquid droplets and/or solid particles might all the same enter the branched-off conduit, they will fall back again into the main gas conduit. It may also be useful if only a limited number of branched-off conduits are not horizontal. Said branched-off conduits and the collecting conduits and the main conduits may be provided with one or more elements restricting their passage area for the purpose of promoting the desired flow rates in the main conduits and the branched-off conduits.

The embodiment according to FIGURE 2 is especially of importance if a very small and compact apparatus is desired. In addition, said embodiment is even simpler structurally and consequently the cost of manufacturing is lower. In FIGURE 2 the reference numeral 1' designates the supply conduit. The discharge conduit is designated by the reference number 8' and the outlet for the impurities by the reference numeral 6' with which is associated valve 7'. In FIG. 2 the main conduit for the passage of gas containing impurities consists of a tube which widens out and which is composed of coaxial cylindrical rings 10, the diameters of which increase stepwise in the direction of flow. Said rings 10 are secured to one another in a manner not shown, but between the end of each ring and the beginning of the next ring there is a free annular passage 11. As regards their diameter, the cylindrical rings are preferably so dimensioned that the passage area of the passages 11 successively decreases in the direction of flow, so that the last passage area is very small. The joint passage area of all the annular passages is preferably larger than the passage area of the supply conduit 1'. The tubular body formed by the cylindrical rings 10 is surrounded by a cylindrical casing 12 forming the beginning of the discharge conduit for the purified gases. Because the body formed by the cylindrical rings 10 has a conical configuration while the casing 12 is of a cylindrical shape the passage area between the tubular body and the casing 12 increases stepwise in the direction of flow and towards the conduit 8'.

In the embodiment according to FIG. 2, the separation between purified gas and impure gas is very effective. This is primarily due to the fact that the tubular body through which the gas containing impurities passes widens out stepwise, so that the discharge openings are always located sideways of the main gas stream through said body. In addition the direction of flow of the gas through the discharge openings is even opposite to the direction of the flow of the main stream.

Another favorable effect of the widening out of the tubular body in the direction of flow of the gas stream passing therethrough is that the rate of flow of the gas containing impurities successively decreases until ultimately said rate is very small so that the impurities cannot be entrained by the gas any longer and in consequence will precipitate.

What is claimed is:

1. Apparatus for removing particles from a gas, said apparatus comprising a main conduit, said main conduit having an inlet end and an outlet end, said inlet end being adapted for charging said gas in said main conduit in a downwardly direction, a collecting conduit being provided with an inlet and an outlet end, said inlet end of said collecting conduit being coupled to said outlet end of said main conduit, a plurality of branched-off conduits distributed in sequence along said main conduit and inclined therewith, each of said branched-off conduits being in communication with said collecting conduit, the branched-off conduits on said main conduit which are successively closer to said inlet end of said main conduit being successively closer to said outlet end of said collecting conduit, means coupled to said outlet end of said main conduit for controllably discharging the particles, at least one passage area restricting element in the collecting conduit.

2. Apparatus for removing particles from a gas, said apparatus comprising a main conduit, said main conduit having an inlet end and an outlet end, said inlet end being adapted for charging said gas in said main conduit in a downwardly direction, a collecting conduit being provided with an inlet and an outlet end, said inlet end of said collecting conduit being coupled to said outlet end of said main conduit, a plurality of branched-off conduits distributed in sequence along said main conduit and inclined therewith, each of said branched-off conduits being in communication with said collecting conduit, the branched-off conduits on said main conduit which are successively closer to said inlet end of said main conduit being successively closer to said outlet end of said collecting conduit, means coupled to said outlet end of said main conduit for controllably discharging the particles, and passage area restricting elements associated with all but the uppermost of said branched-off conduits and remote from said main conduit.

3. Apparatus for removing particles from a gas, said apparatus comprising a main conduit, said main conduit having an inlet end and an outlet end, said inlet end being adapted for charging said gas in said main conduit in a downwardly direction, a collecting conduit being provided with an inlet and an outlet end, said inlet end of said collecting conduit being coupled to said outlet end of said main conduit, a plurality of branched-off conduits distributed in sequence along said main conduit and inclined therewith, each of said branched-off conduits being in communication with said collecting conduit, the branched-off conduits on said main conduit which are successively closer to said inlet end of said main conduit being successively closer to said outlet end of said collecting conduit, means coupled to said outlet end of said main conduit for controllably discharging the particles, and at least one passage area restricting element in the collecting conduit, the passage area of said passage area restricting element being at least equal to the passage area of the main conduit at the inlet end.

4. Apparatus for removing particles from a gas, said apparatus comprising a main conduit, said main conduit having an inlet end and an outlet end, said inlet end being adapted for charging said gas in said main conduit in a downwardly direction, a collecting conduit being provided with an inlet and an outlet end, said inlet end of said collecting conduit being coupled to said outlet end of said main conduit, a plurality of branched-off conduits distributed in sequence along said main conduit and inclined therewith, each of said branched-off conduits being in communication with said collecting conduit, the branched-off conduits on said main conduit which are successively closer to said inlet end of said main conduit being successively closed to said outlet end of said collecting conduit, means coupled to said outlet end of said main conduit for controllably discharging the particles, passage area restricting elements in the collecting conduit between adjacent branched-off conduits.

5. Apparatus for removing particles from a gas, said apparatus comprising a main conduit, siad main conduit having an inlet end and an outlet end, said inlet end being adapted for charging said gas in said main conduit in a downwardly direction, a collecting conduit being provided with an inlet and an outlet end, said inlet end of said collecting conduit being coupled to said outlet end of said main conduit, a plurality of branched-off conduits distributed in sequence along said main conduit and inclined therewith, each of said branched-off conduits being in communication with said collecting conduit, the branched-off conduits on said main conduit which are successively closer to said inlet end of said main conduit being successively closer to said outlet end of said collecting conduit, means coupled to said outlet end of said main conduit for controllably discharging the particles, passage area restricting elements in the collecting conduit between adjacent branched-off conduits wherein said main conduit is curvilinear, said main conduit having inner and outer bend surfaces, the branched-off conduits being connected to the main conduit at the inner bend surface.

References Cited in the file of this patent
UNITED STATES PATENTS

| | | |
|---|---|---|
| 1,283,961 | Sutton | Nov. 5, 1918 |
| 2,591,408 | Crankshaw | Apr. 1, 1952 |
| 2,076,815 | Fulweiler | Apr. 13, 1957 |

FOREIGN PATENTS

| | | |
|---|---|---|
| 380,916 | Germany | Sept. 13, 1923 |
| 134,745 | Austria | Sept. 25, 1938 |
| 119,075 | Sweden | Apr. 24, 1947 |